United States Patent
Ting et al.

(10) Patent No.: US 10,704,537 B2
(45) Date of Patent: *Jul. 7, 2020

(54) HIGH THROUGHPUT FABRICATION OF SOFT MACHINES

(71) Applicant: President and Fellows of Harvard College, Cambridge, MA (US)

(72) Inventors: Jason Ming Ting, Katy, TX (US); Alok Suryavamsee Tayi, Somerville, MA (US); Bobak Mosadegh, New York, NY (US); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/991,008

(22) Filed: May 29, 2018

(65) Prior Publication Data

US 2019/0024644 A1 Jan. 24, 2019

Related U.S. Application Data

(63) Continuation of application No. 14/685,456, filed on Apr. 13, 2015, now Pat. No. 10,066,444.

(Continued)

(51) Int. Cl.
*F03G 7/06* (2006.01)
*F15B 15/10* (2006.01)
(Continued)

(52) U.S. Cl.
CPC ............... *F03G 7/06* (2013.01); *B32B 3/26* (2013.01); *B32B 5/028* (2013.01); *B32B 7/02* (2013.01);
(Continued)

(58) Field of Classification Search
CPC ............ F03G 7/06; B32B 27/08; B32B 5/028; B32B 7/02; B32B 27/40; B32B 3/26;
(Continued)

(56) References Cited

U.S. PATENT DOCUMENTS 7,323,143 B2 * 1/2008 Anderson .............. B01D 61/18
422/502
9,492,930 B2 * 11/2016 Galloway ............ B25J 15/0023
(Continued)

FOREIGN PATENT DOCUMENTS

CN 1650110 A 8/2005
DE 102006014365 A1 10/2007
(Continued)

OTHER PUBLICATIONS

Ilievski et al., "Soft Robotics for Chemists", Online Suplemental Materials, Jun. 20, 2013, (retrieved from the internet Apr. 12, 2015) <URL https://gmwgroup.harvard.edu/pubs/Suplemental/1112.pdf>, 7 pages.

(Continued)

*Primary Examiner* — Philip C Tucker
*Assistant Examiner* — Vicki Wu
(74) *Attorney, Agent, or Firm* — Wilmer Cutler Pickering Hale and Dorr LLP

(57) ABSTRACT

A soft robot device includes at least a first thermoplastic layer and a second thermoplastic layer, wherein at least one layer is comprised of an extensible thermoplastic material; at least one layer is an inextensible layer; and at least one layer comprises a pneumatic network, wherein the pneumatic network is configured to be in fluidic contact with a pressurizing source, wherein the first and second thermoplastic layers are thermally bonded to each other.

16 Claims, 11 Drawing Sheets

Related U.S. Application Data

(60) Provisional application No. 61/978,573, filed on Apr. 11, 2014.

(51) Int. Cl.
| | | |
|---|---|---|
| *B32B 27/40* | (2006.01) | |
| *B32B 7/02* | (2019.01) | |
| *B32B 5/02* | (2006.01) | |
| *B32B 27/08* | (2006.01) | |
| *B32B 3/26* | (2006.01) | |
| B32B 37/04 | (2006.01) | |
| B32B 37/18 | (2006.01) | |
| B29C 65/02 | (2006.01) | |
| B29C 65/00 | (2006.01) | |

(52) U.S. Cl.
CPC .............. *B32B 27/08* (2013.01); *B32B 27/40* (2013.01); *F15B 15/103* (2013.01); *B29C 65/02* (2013.01); *B29C 66/0342* (2013.01); *B29C 66/1122* (2013.01); *B29C 66/45* (2013.01); *B29C 66/5346* (2013.01); *B29C 66/71* (2013.01); *B29C 66/712* (2013.01); *B29C 66/73921* (2013.01); *B32B 37/04* (2013.01); *B32B 37/18* (2013.01); *B32B 2307/51* (2013.01); *Y10T 156/10* (2015.01); *Y10T 156/1041* (2015.01); *Y10T 428/2495* (2015.01); *Y10T 428/24331* (2015.01); *Y10T 428/24612* (2015.01); *Y10T 428/24942* (2015.01); *Y10T 428/24983* (2015.01)

(58) Field of Classification Search
CPC ..... B32B 2307/51; B32B 37/04; B32B 37/18; F15B 15/103; Y10T 428/24331; Y10T 428/24612; Y10T 428/24942; Y10T 428/2495; Y10T 428/24983; Y10T 156/10; Y10T 156/1041; B29C 65/02; B29C 66/0342; B29C 66/1122; B29C 66/5346; B29C 66/71; B29C 66/712; B29C 66/73921
USPC .......................................................... 156/245
See application file for complete search history.

(56) References Cited

U.S. PATENT DOCUMENTS

| | | | |
|---|---|---|---|
| 9,797,415 B2 * | 10/2017 | Martinez | B25J 9/142 |
| 10,006,444 B2 * | 6/2018 | Ting | F15B 15/103 |
| 2005/0081711 A1 | 4/2005 | Kerekes et al. | |
| 2009/0072441 A1 | 3/2009 | Bracke | |
| 2009/0142528 A1 | 6/2009 | Tilton | |
| 2011/0126911 A1 | 6/2011 | Kobrin et al. | |
| 2012/0216672 A1 | 8/2012 | Menon et al. | |
| 2013/0317130 A1 * | 11/2013 | Brassard | B29C 43/021 |
| | | | 521/146 |
| 2014/0318118 A1 * | 10/2014 | Mazzeo | B25J 9/1075 |
| | | | 60/527 |
| 2015/0090113 A1 * | 4/2015 | Galloway | B25J 15/0023 |
| | | | 92/48 |
| 2015/0266186 A1 * | 9/2015 | Mosadegh | B25J 9/142 |
| | | | 92/34 |

FOREIGN PATENT DOCUMENTS

| | | |
|---|---|---|
| EP | 1190819 A1 | 3/2002 |
| GB | 2445738 A | 7/2008 |
| JP | 2002-248111 A | 9/2002 |
| JP | 2006204612 A | 8/2006 |
| JP | 2010-515924 A | 5/2010 |
| JP | 2013-512116 A | 4/2013 |
| WO | WO-03/074885 A1 | 9/2003 |
| WO | WO-2010/091897 A1 | 8/2010 |
| WO | WO-2011/068762 A1 | 6/2011 |
| WO | WO-2012/136347 A1 | 10/2012 |
| WO | WO-2012/148472 A2 | 11/2012 |
| WO | WO-2013/110086 A1 | 7/2013 |

OTHER PUBLICATIONS

International Search Report and Written Opinion dated Dec. 29, 2015 in International Application No. PCT/US15/25588, filed on Apr. 13, 2015, 10 pages.
Shepherd et al., "Multigait Soft Robot", PNAS Early Edition, Dec. 20, 2011, pp. 20400-20403.
Shepherd et al., "Supporting Information", PNAS, Dec. 15, 2011, pp. 1-7.
European Search Report dated Dec. 7, 2017 in European Application No. 15814751.2, 8 pages.

* cited by examiner

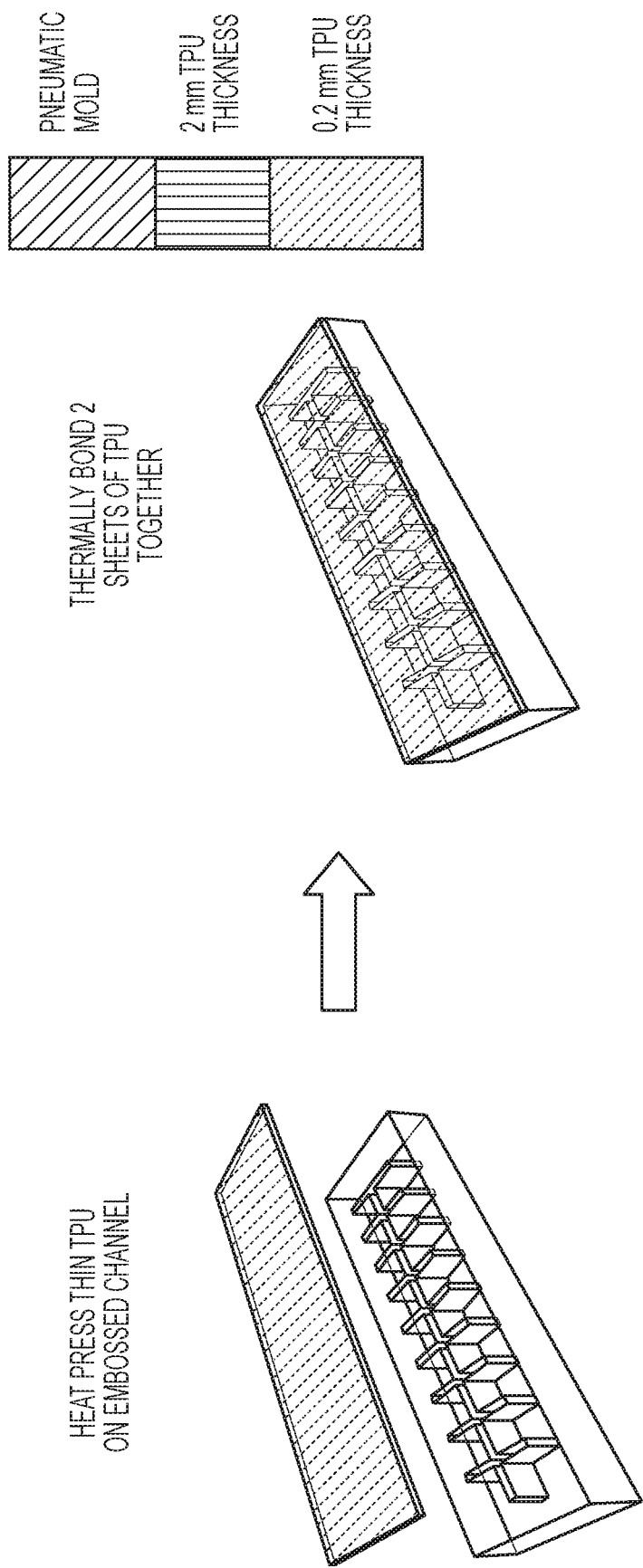

HIGH THROUGHPUT FABRICATION OF SOFT MACHINES

CROSS-REFERENCE(S) TO RELATED APPLICATIONS

This application is a continuation of U.S. patent application Ser. No. 14/685,456, filed Apr. 13, 2015, which claims the benefit of U.S. Provisional Application No. 61/978,573 filed on Apr. 11, 2014, the content of which is hereby incorporated by reference herein in its entirety.

STATEMENT REGARDING FEDERALLY SPONSORED RESEARCH OR DEVELOPMENT

The present invention was made with United States government support under Grant No. W911NF-09-1-0476 awarded by the U.S. Army Research Office. The United States government may have certain rights in this invention.

BACKGROUND

Soft robotics using interconnected channels in a molded elastomeric body have been reported. Soft machine are based on cephalopods—animals without a skeleton like octopus and squid. They are created out of soft material with a simplistic design and are designed to mimic the movements of the cephalous by pressurizing a soft device having embedded channels. Soft robotics can be actuated using pneumatic pressure to cause the robot to undergo a range of motions. The basic soft robotic actuator includes an extensible channel or bladder that expands against a stiffer or less extensible backing. See, PCT Appln. Ser. No. PCT/US11/61720 for additional information on the design and actuation of soft robotics, the contents of which are incorporated in its entirety by reference.

Molding is one way to make soft robotic actuators; however, it is a batch process. Curing of the plastic materials can take time and the manufacturing process is idle during curing time. Device fabrication with higher throughput is desired.

SUMMARY

Low cost, high throughput methods for making soft robotics are described. A new, scalable procedure for fabricating soft machines using thermoplastic resins is described. In other aspects, continuous process for making soft robotics is described. A thermal bonded soft robotic is provided.

In one aspect, a soft robot device includes at least a first thermoplastic layer and a second thermoplastic layer, wherein: at least one layer is comprised of an extensible thermoplastic material; at least one layer is an inextensible layer; and at least one layer comprises a pneumatic network, wherein the pneumatic network is configured to be in fluidic contact with a pressurizing source, wherein the first and second thermoplastic layers are thermally bonded to each other.

In one or more embodiments, the inextensible layer houses the pneumatic network.

In one or more embodiments, the first layer is the extensible layer, the second layer is the inextensible layer, and the first layer is thinner than the second layer.

In one or more embodiments, the first layer is the extensible layer and the first layer houses the pneumatic network and the second layer is the inextensible layer, and optionally, the second layer is made of a stiffer thermoplastic material, and for example, the second layer comprises an inelastic fabric, web or mesh bonded to or embedded in the thermoplastic layer.

In any of the preceding embodiments, the first and second thermoplastic layers are directly bonded to one another, or the first and second thermoplastic layers are bonded to one another through one or more intervening layers.

In any of the preceding embodiments, the pneumatic network is a hot embossed pneumatic network, or the pneumatic network is cut from the layer to form channels and chambers.

In one or more embodiments, the device further includes a third thermoplastic layer, wherein: the first thermoplastic layer comprises the extensible layer, the second thermoplastic layer comprises the inextensible layer, and the third thermoplastic layer is disposed between the first and second thermoplastic layers and houses the pneumatic network, and optionally, the inextensible layer comprises an inelastic fabric, web or mesh bonded to or embedded in the second thermoplastic layer and/or the extensible layer comprises an elastic fabric, web or mesh bonded to or embedded in the first thermoplastic layer.

In one or more embodiments, the third thermoplastic layer is made of two or more sublayers, which in combination form the pneumatic device.

In any of the preceding embodiments, at least one of the thermoplastic layers comprises a thermoelastic material, and optionally, the thermoelastic material is a thermoplastic polyurethane.

In another aspect, a method of actuating a soft robot device includes providing a soft robot device as described herein and pressurizing the pneumatic network to cause the extensible layer to expand and soft device to move from a first resting position to a second actuated position.

In another aspect, a method of making a soft robot device includes providing a first thermoplastic layer and a second thermoplastic layer; and applying heat and/or pressure to the first and second thermoplastic layers to thermally bond the layers, wherein: at least one layer is comprised of an extensible thermoplastic material; at least one layer is an inextensible layer; and at least one layer comprises a pneumatic network, wherein the pneumatic network is configured to be in fluidic contact with a pressurizing source.

In one or more embodiments, the inextensible layer houses the pneumatic network.

In one or more embodiments, the first layer is the extensible layer, the second layer is the inextensible layer, and the first layer is thinner than the second layer.

In one or more embodiments, the first layer is the extensible layer and the first layer houses the pneumatic network and the second layer is the inextensible layer, and optionally, the second layer is comprised of a stiffer thermoplastic material, and/or the second layer comprises an inelastic fabric, web or mesh bonded to or embedded in the thermoplastic layer.

In one or more embodiments, the first and second thermoplastic layers are directly bonded to one another, or the first and second thermoplastic layers are bonded to one another through one or more intervening layers.

In one or more embodiments, the method further includes hot embossing the pneumatic network into the thermoplastic layer, or cutting the thermoplastic layer to form channels and chambers of the pneumatic network.

In one or more embodiments, the method further includes providing a third thermoplastic layer and disposing the third thermoplastic layer between the first and second thermoplastic layers, wherein: the first thermoplastic layer comprises the extensible layer, the second thermoplastic layer comprises the inextensible layer, and the third thermoplastic layer houses the pneumatic network.

In one or more embodiments, the inextensible layer is made of an inelastic fabric, web or mesh bonded to or embedded in the second thermoplastic layer.

In one or more embodiments, extensible layer is made of an elastic fabric, web or mesh bonded to or embedded in the first thermoplastic layer.

In one or more embodiments, at least one of the thermoplastic layers comprises a thermoelastic material, and optionally, the thermoelastic material comprises a thermoplastic polyurethane.

These and other aspects and embodiments of the disclosure are illustrated and described below.

BRIEF DESCRIPTION OF THE DRAWINGS

The invention is described with reference to the following figures, which are presented for the purpose of illustration only and are not intended to be limiting.

In the Drawings:

FIG. 3 is a schematic illustration of the thermal bonding of a backing to a pneumatic network according to one or more embodiments.

FIGS. 6A-6C are schematic illustrations demonstrating a thermal bonding process using laser cut sheets according to one or more embodiments, in which FIG. 6A shows a plan view of the two centrally located thermoplastic layers used to make the pneumatic channels, FIG. 6B shows a cross-sectional view of the composition, layer order and thickness dimensions of the layers used to make a soft robot machine, and FIG. 6C is an exploded view of the soft robot machine according to one or more embodiments.

FIGS. 7A-7C are schematic illustrations demonstrating a thermal bonding process using laser cut sheets according to one or more embodiments, in which FIG. 7A shows a plan view of the centrally located thermoplastic layer used to make the pneumatic channels, FIG. 7B shows a cross-sectional view of the composition, layer order and thickness dimensions of the layers used to make a soft robot machine, and FIG. 7C is an exploded view of the soft robot machine according to one or more embodiments.

DETAILED DESCRIPTION

A scalable procedure for fabricating soft machines using thermoplastic materials is described. The machines include a first elastic expandable (extensible) layer and a second relatively stiffer, inextensible layer thermally bonded to the first layer. The layers may be directly bonded to each other or they may be bonded through one or more intervening layers. The machines also include a pneumatic network that is pressurized to actuate the machine. The pneumatic network can be located in either the extensible or the inextensible layer, or in a third central layer positioned between the two layers. The stiffer, inextensible layer may optionally include a reinforcing layer, such as a paper or mesh fabric.

In one or more embodiments, a soft robot machine can be made by heat bonding layers of thermoplastic materials. A thermoplastic materials becomes pliable or moldable above a specific temperature and solidifies upon cooling. At least one of the layers is a thermoplastic elastomer. A thermoplastic elastomer possesses both thermoplastic and elastomeric properties. The soft robot machines can be formed by applying heat, pressure, or both to individual sheets of material (e.g., thermoplastics, mesh, fabric (stiff/extensible), plastic sheets, metal, etc.) to form a soft machine. Hot pressing allows easy combination of thermoplastics with non-elastomeric materials, like mesh, plastic pieces, fabrics (extensible and inextensible), etc.

Figure 1:
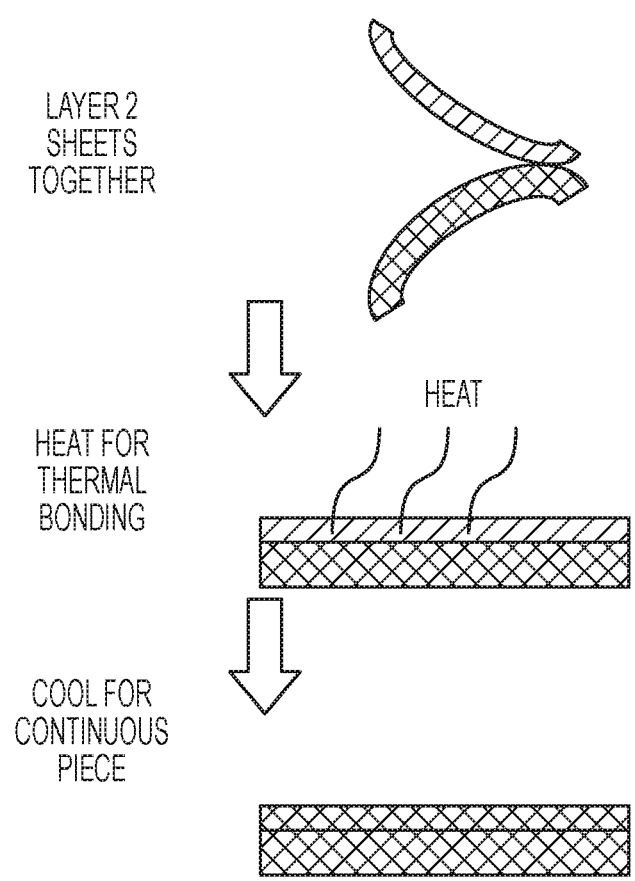
FIG. 1 is a schematic illustration of a thermal bonding process to form a soft robot machine according to one or more embodiments.

An exemplary heat bonding process is shown in FIG. 1. Two sheets of thermoplastic material are brought together. At least one of these sheets is a thermoplastic elastomer. The second sheet is a thermoplastic material, and optionally can also be a thermoplastic elastomer. Heat is applied to those areas where bonding is desired. Heating and/or pressure can be by physical contact with a hot surface, or by laser heating or any conventional methods. In those areas where heat is applied, the thermoplastic materials soften and bond together. The body is then cooled to resolidify the thermoplastic materials and to form a solid bond. In one or more embodiments, the materials can be of similar composition to enhance bonding strength between the two layers. A monolithic-like device or piece of elastomer can be formed by using heat, pressure, or both.

The elastic property can be used in the soft robot device for elastic expansion during actuation. In some embodiment, the extensible layer can include the pneumatic network. In other embodiments, the inextensible sheet is thicker than the first extensible layer and includes a negative space that defines a pneumatic network. In one or more embodiments, the second sheet can include a reinforcing fabric embedded therein to enhance the non-extensibility of the layer.

As used herein "inextensible" is a relative term and is used to indicate a layer property relative to the other layers in the soft machine. That is, an 'inextensible' layer requires a greater pressurizing force relative to an 'extensible' layer for expansion or extension of a layer dimension to occur.

It is faster to produce soft machines using thermoplastic bonding than the conventional molding technique previously used for manufacture of soft machines. The extensible layer, with or without pneumatic networks, can be formed by several manufacturing techniques (e.g. laser cutting, reel-to-reel dicing, embossing, 3d printing, etc.). Combining disparate layers (e.g. extensible and inextensible layers) can be done quickly with heat, pressure, or both. The thermoplastic is heat sealed quickly. Two layers of thermoplastic elastomer can be bonded with heat to create a nearly continuous piece. Liquid elastomers that cure (e.g., room-temperature vulcanizing rubbers) are not required to fabricate these soft machines. Thus, the hot thermal bonding method does not require a waiting time for hardening as is the case for molded elastomers.

Figure 2:
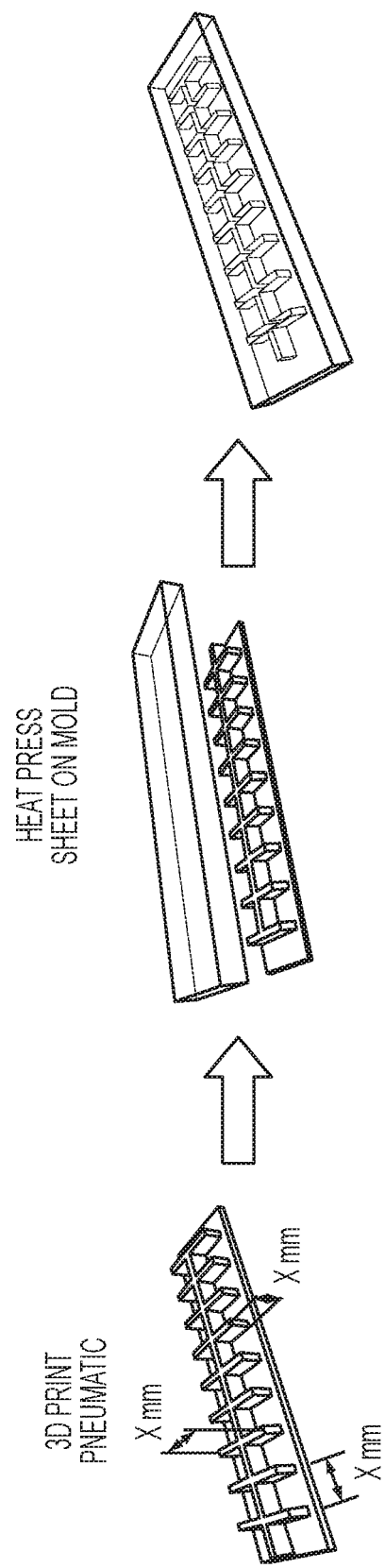
FIG. 2 is a schematic illustration of hot embossing of a pneumatic network in a thermoplastic sheet according to one or more embodiments.

In one embodiment, a hot embossing method is employed to form a soft machine having one or more interconnected internal (pneumatic) chambers. FIG. 2 is a schematic representation of an exemplary hot embossing process. A negative replica mold of the pneumatic network is provided. The mold serves to imprint a negative space on a sheet for the pneumatic channel. As shown in the figure, the height of the raised features, (e.g., depth of the channels), spacing between raised features (e.g., spacing between channels) and width of the raised features (e.g., width of the channels) are selected to define the final pneumatic network features. The negative replica mold can be made by any conventional means, such as lithographic techniques, laser techniques or 3D printing. 3D printing is an inexpensive, versatile and rapid method for making the negative mold.

Next, a heat softened thermoplastic sheet is pressed into the mold and released. A thermoplastic layer or sheet is heated to soften and a negative replica mold of the pneumatic network is pressed into the softened layer to provide an imprint to the pneumatic layer. The thermoplastic sheet retains the imprint of the embossed pneumatic channels.

After the pneumatic network is formed, a backing is applied to form the channels as is shown in FIG. 3. A backing is applied to the imprinted sheet by thermal bonding to seal the chambers. Both the sheet used for the pneumatic channels and the backing sheet are thermoplastic materials. In one or more embodiments, they can be thermoplastic polyurethane ("TPU").

The soft devices can use differences in layer thicknesses to create the differences in extensibility used for actuation. Thus, it is possible for the same material to be used in the manufacture of the device. In one embodiment, the thermoelastic materials are selected so that the thin backing sheet is the extensible layer. In this instance, the stiffer, e.g., inextensible, layer is the thicker sheet containing the pneumatic network.

In other embodiments, the urethanes are selected so that the thin backing sheet is stiffer than, e.g., inextensible, the thicker sheet containing the pneumatic network. In one or more embodiments, both layers are made from the same thermoplastic elastomer, but the backing sheet includes a reinforcing fabric to render it inextensible.

In one exemplary embodiment, the thin thermoplastic layer has a thickness of 0.2 mm and the thick layer housing the pneumatic network has a thickness of 2.0 mm. However, hot embossing can be used for a range of different polymer materials and thicknesses. There are no theoretical limitations to the length and width dimensions for the thermoplastic layers. In certain embodiments, the lateral dimensions (length and width) can vary widely from 10 µm to 1 m; while thickness can vary from 10 µm to 10 cm.

Figure 4A:
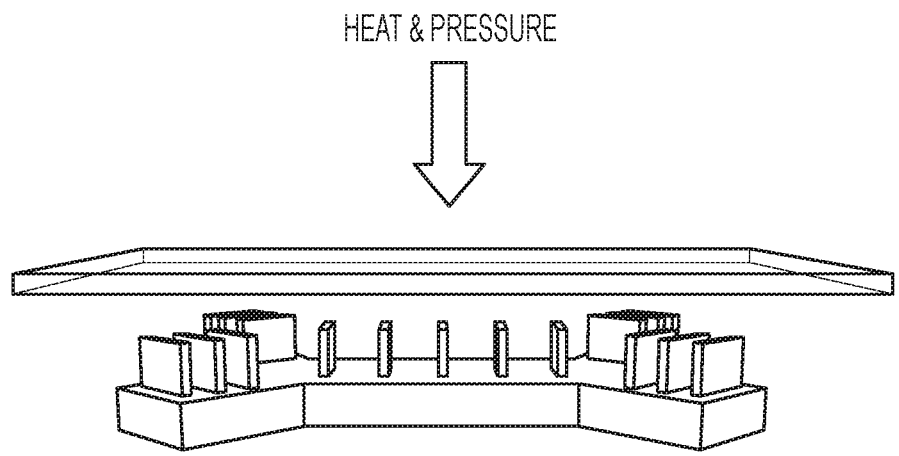
FIG. 4A is a schematic illustration of a hot embossing process for manufacture of a quadruped soft robotic, such as shown in FIG. 4B.
Figure 4B:
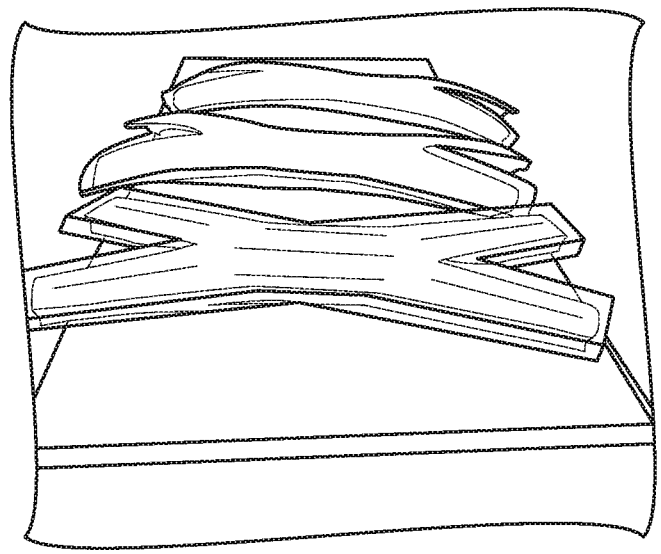

The embossing technique is not limited to simple 'arm'-like geometries and can be used to make soft robotics having a more complex shapes. FIG. 4A is an illustration of an embossing process that can be used to make a quadrupedal soft robotic, such as those shown in FIG. 4B.

Figure 5:
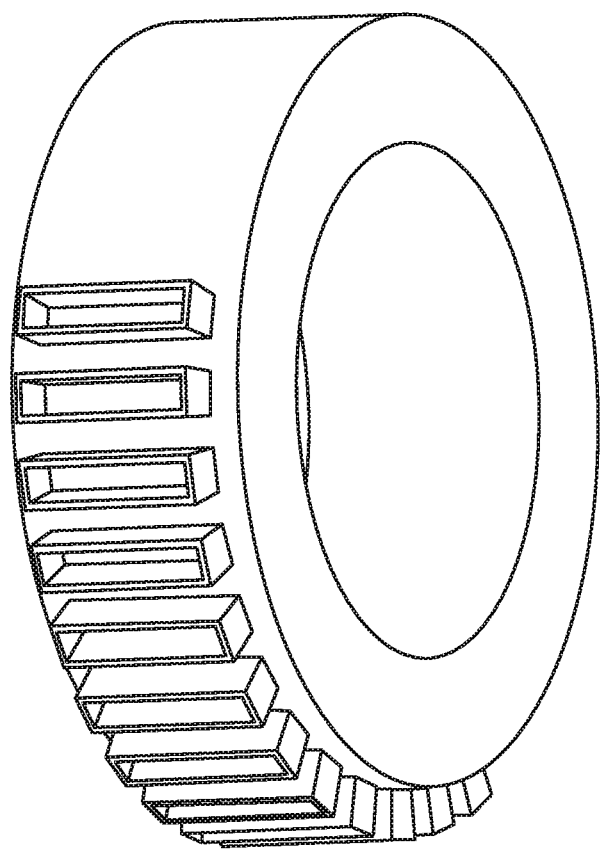
FIG. 5 is a schematic illustration demonstrating a continuous embossing process according to one or more embodiments.

These soft machine devices can be made by continuous manufacturing processes. A reel to reel fabrication is provided as shown in FIG. 5. This hot pressing approach can enable reel-to-reel manufacturing of soft machines (either full devices or individual actuating building blocks that can be combined later). The process is similar to the first step of soft lithography. A negative replica mold of the pneumatic network is secured to a backing such as a wheel and the wheel is pressed or rolled onto a heated sheet of polymer to imprint the pneumatic network. The imprinted polymer sheets can be then heat bonded in a subsequent continuous process to a backing layer to form the soft robot.

One component of these soft machines is thermoplastics. In one example, a thermoplastic polyurethane ("TPU") can be used. TPUs become liquid-like when heated above a critical temperature, for example, above 60° C., or above 170° C., and becomes solid-like and retains its shape after it cools down. The cooled plastics can range from stiff to flexible. TPUs are formed by the reaction of: (1) diisocyanates with short-chain diols (so-called chain extenders) and (2) diisocyanates with long-chain diols. The practically unlimited amount of possible combinations producible by varying the structure and/or molecular weight of the three reaction compounds allows for an enormous variety of different TPU. Thus, it is possible to select the appropriate TPU having the desired final properties of the material, such as the appropriate elasticity for either the pneumatic network or stiffer base. Suitable TPUs are the family of Ellastane TPUs available from BASF.

A pneumatic network can be embossed into a thermoplastic with a planar mold/imprint in 5 minutes, or less. Conventional soft machines require that a liquid elastomer be cured inside a mold—this requirement occupies the mold as the rubber cures. The faster embossing process could allow for faster manufacturing as the mold is only used to emboss rapidly.

In another aspect, the layers do not need to be embossed. For example, a soft bodied machine is prepared using thermoplastic layers that have been cut, e.g., laser-cut, to form channels and chambers. Laser cutting or die cutting can be used to fabricate intricate, complex pneumatic networks; such pneumatic networks/designs may not be achievable by soft lithographic approaches.

Figure 6C:
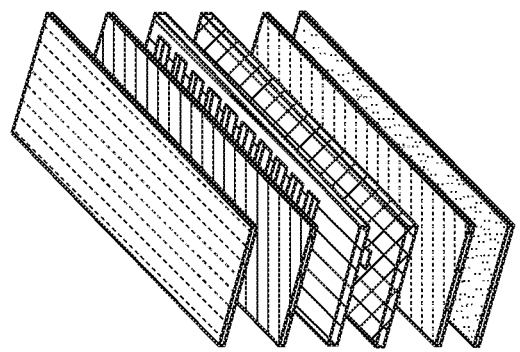
Figure 6B:
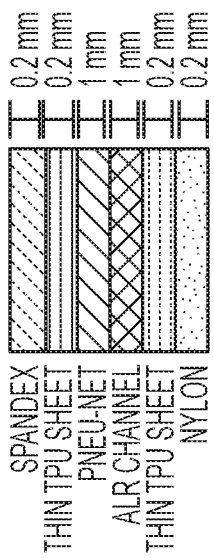
Figure 6A:
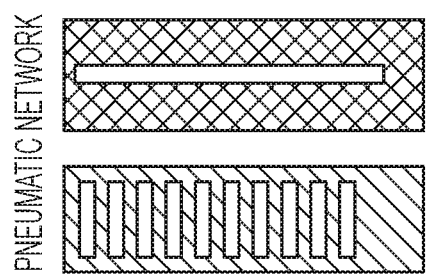

It is possible to cut out pneumatic channels in to thick sheets with a laser cutter. A plurality of layers can be combined to provide the fluidic pathways used in the pneumatic network using simple two-dimensional designs. The multiple thermoplastics layers can be used to build a device with different materials As shown in FIG. 6A, a first layer can include a set of rectangular features that define the pneumatic chambers (left) and a second layer can define a channel that traverses across the pneumatic chambers and which can serve as an air channel to pneumatically connect the chambers (right). The layers can be made of the same materials and of the same thickness, so that the two layers can operate as a single unit once thermally bonded. The pneumatic system is heat sealed with upper and lower thin layers of thermoplastic, e.g., thin TPU layers. Upper and lower sheets of different stiffness can be used on the top and bottom surfaces to create the material differences need to preferentially inflate the device in one direction. For example, spandex (extensible) can be used on top and nylon (inextensible) on bottom. The various layers and exemplary layer thicknesses are shown in a cross-sectional view in FIG. 6B. FIG. 6C shows the same layers in an exploded perspective view. Thus, instead of relying on TPU layers with different thicknesses to create differences in stiffness, uniform thickness body can serve as extensible and inextensible layer. The thermoplastic nature of the layers permits one to thermal bond all the layers together.

Figure 7C:
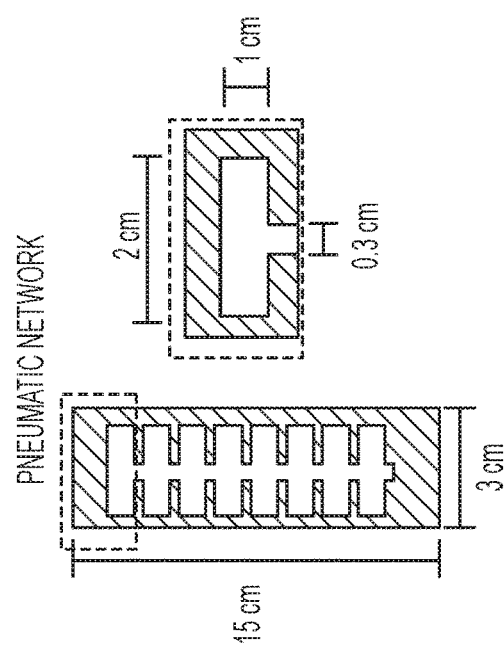
Figure 7B:
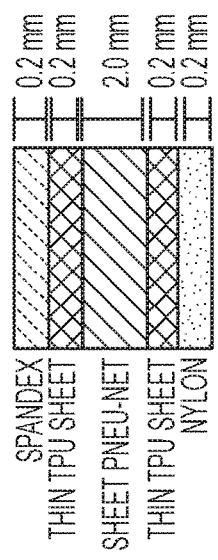
Figure 7A:
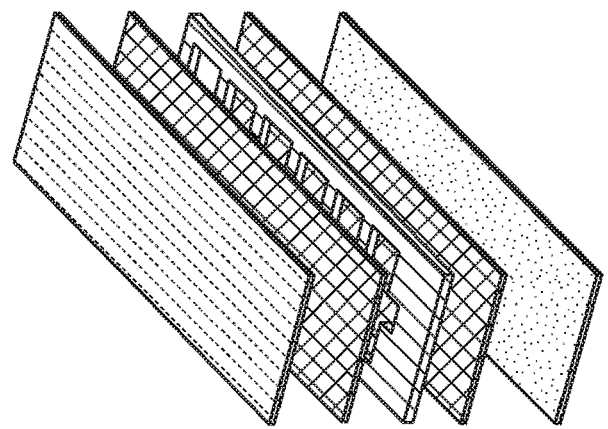

FIG. 7 is another embodiment of a soft actuatable device that uses multiple thermally bonded layers. In this embodiment, the pneumatic network is cut into a thicker TPU layer and the aspect ratio for each channel twice as large, as is shown in FIGS. 7A and 7B. Two thin TPU layers flank the pneumatic channel and serve to seal the fluidic channels as a container for fluids. Outer layers of spandex (extensible) and nylon (non-extensible) are bonded to the TPU thin layers. FIG. 7C shows the same layers in an exploded perspective view.

Figure 8:
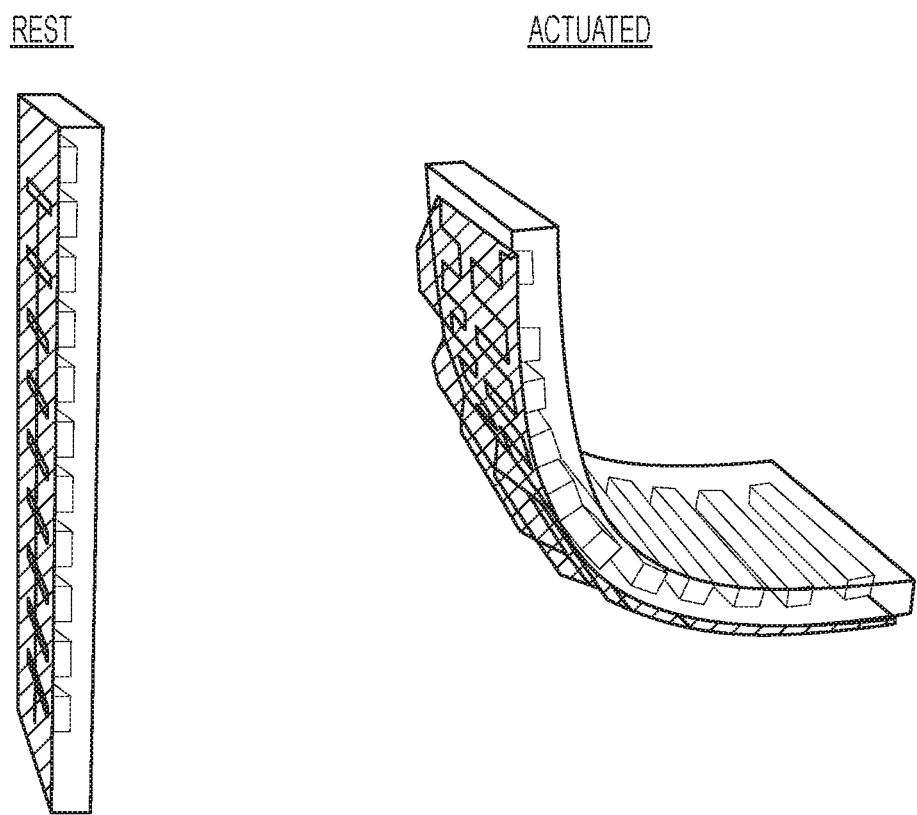
FIG. 8 is a schematic illustration of an actuation of a soft robot device according to one or more embodiment.

FIG. 8 illustrates actuation of a soft machine "finger" according to one or more embodiments. In this embodiment, the thin sheet serves as the extensible layer and the thicker layer having the pneumatic network serves as the stiffer, inextensible layer. At rest (shown on the left), the soft robot machine is flat. Once pressurized, the thin layer expands and bows outward, causing the machine to bend away from the extensible layer (shown on the right).

Figure 9:
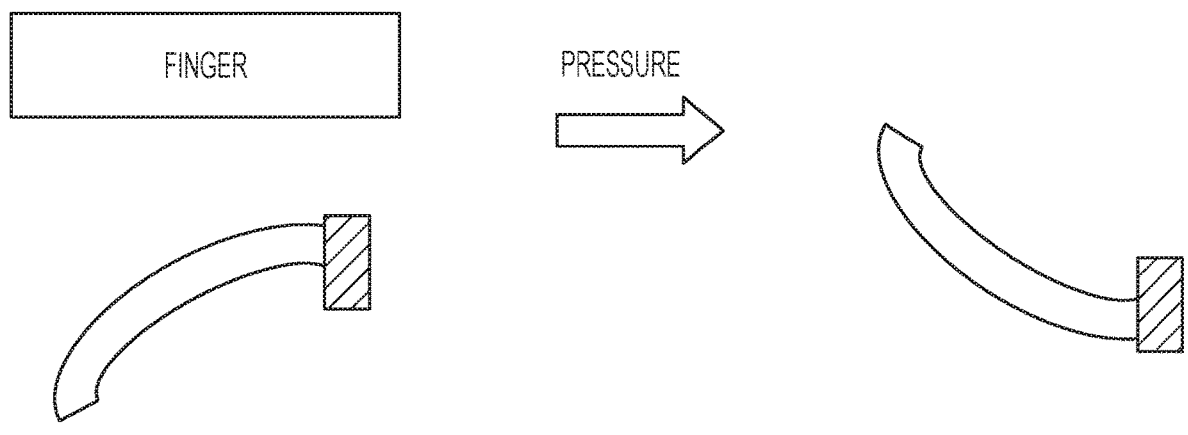
FIG. 9 is a schematic illustration showing activation of a finger device according to one or more embodiments.
Figure 10:
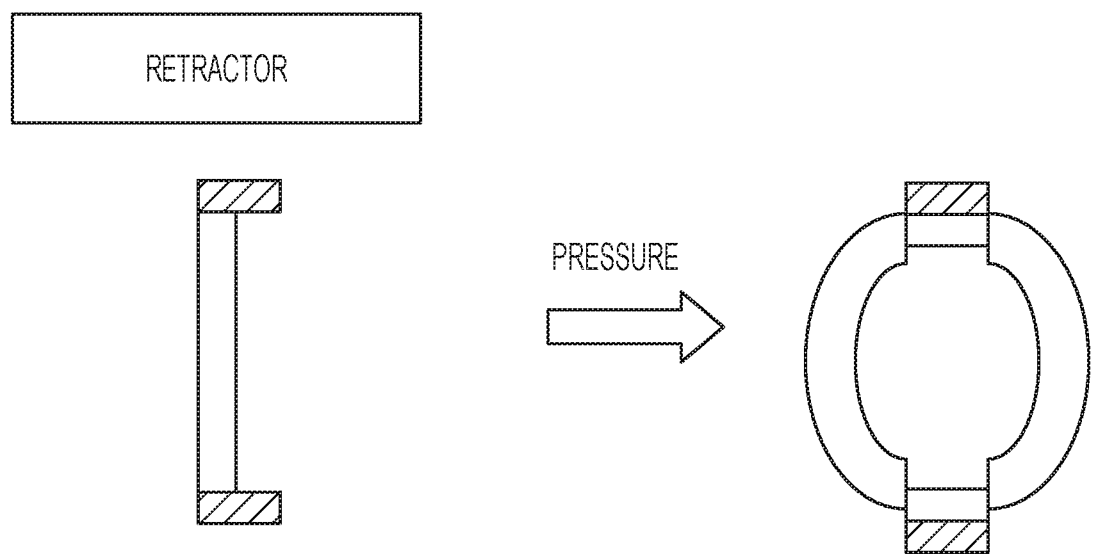
FIG. 10 is a schematic illustration showing activation of a two finger devices joined at each end according to one or more embodiments.
Figure 11B:
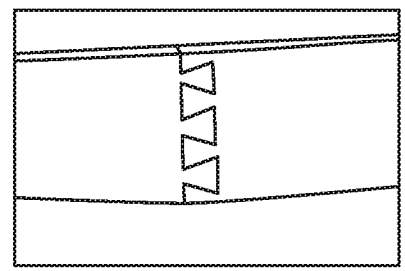
FIG. 11B is a photograph of a bonded end of the retract, with the bond edge indicated
Figure 11A:
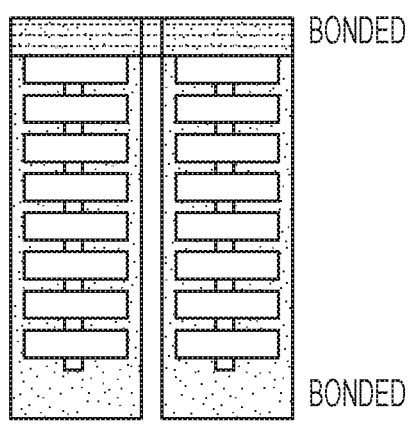
FIG. 11A is an illustration of a retract made using two finger devices joined at each end.
Figure 11C:
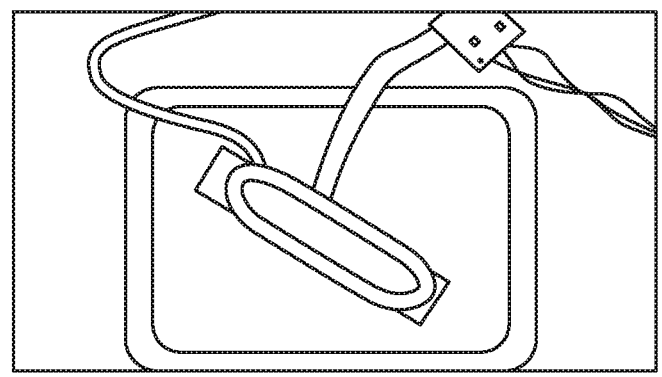
FIG. 11C is a photograph of an actuated retract, according to one or more embodiments.

Different devices with different functionalities can be created, such as devices having functionality as a Finger (or gripper when two fingers of opposing direction of actuation are used) and Retractor, such as is shown in FIGS. 9 and 10. The single unit "finger' device can be used as a building block to create more complex motions and functionalities. For example, two 'fingers' can be bonded at the short edges to create a device capable of reversibly opening and closing. FIG. 11 illustrates a retract that has been built using this principle. FIG. 11A is an illustration of a retract made using two finger devices joined at each end. As shown in FIG. 11A, two finger actuators 1100 can be permanently bonded at one end 1120, while the other end 1130 can have a reversible bond, e.g., it is capable of coupling and decoupling. The ability to open and close the retract, makes it easier to use in surgical settings. FIG. 11B is a photograph of reversible connection at the end of the retract, with the bond edge 1140 indicated and FIG. 11C is a photograph of an actuated retract, according to one or more embodiments.

Conventional soft machines also can be difficult to repair. Once the extensible and inextensible layers delaminate, they are difficult to put back together again. Heat can be used to repair small defects like delamination or rupture. Thermoplastic-based soft machines can be repaired by hot pressing the device again. Heat can be applied globally (e.g. over the entire device) or locally (e.g. in a small region) in order to repair the device.

The actuation of soft machines may require anisotropy in mechanical properties of the device. By using thermoplastics, one can combine two materials with similar chemistry (e.g., polyurethane, silicone, etc.), but with different mechanical properties to form a continuous solid unit.

Individual actuators or machines or devices (e.g. building blocks) can be constructed and then combined more easily to form a more complex, sophisticated soft machine. These sophisticated soft machines can be made by combining individual building blocks and applying heat to join the actuators.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise.

The particular embodiments described above are, therefore, to be considered as illustrative and not restrictive. Those skilled in the art will recognize, or be able to ascertain, using no more than routine experimentation, numerous equivalents to the specific embodiments described herein. The scope of the invention is as set forth in the appended claims and equivalents thereof, rather than being limited to the examples contained in the foregoing description.

It is noted that one or more publications, patent application, patents, or other references are incorporated herein. To the extent that any of the incorporated material is inconsistent with the present disclosure, the present disclosure shall control.

What is claimed is:
1. A method comprising:
providing a negative replica mold of a network of pneumatic chambers;
heating a first thermoplastic layer to soften the first thermoplastic layer;
pressing the first thermoplastic layer into the negative replica mold such that the first thermoplastic layer retains an imprint of the network of pneumatic chambers;
removing the negative replica mold;
applying a second thermoplastic layer to the side of the first thermoplastic layer containing the imprint of the network of pneumatic chambers; and
bonding the first and second thermoplastic layers to form the network of pneumatic chambers, forming a soft robotic device comprising said network of pneumatic chambers.

2. The method of claim 1, wherein the bonding is thermal bonding.

3. The method of claim 1, wherein at least one of said first and second thermoplastic layers comprise a thermoplastic polyurethane.

4. The method of claim 1, wherein the bonding comprises thermally heating the first and second thermoplastic layers.

5. The method of claim 1, wherein the negative replica mold is made by lithographic techniques, laser techniques, or 3D printing.

6. The method of claim 1, wherein the negative replica mold comprises raised features and spacing between the raised features.

7. The method of claim 1, wherein one of the first and second thermoplastic layers has a greater stiffness than the other.

8. The method of claim 1, wherein one of the first and second thermoplastic layer has a greater thickness than the other.

9. The method of claim 1, wherein the first thermoplastic layer has a greater thickness than the second thermoplastic layer.

10. The method of claim 9, wherein the second thermoplastic layer is extensible, and the first thermoplastic layer requires a greater pressurizing force relative to the second thermoplastic layer for extension.

11. The method of claim 9, wherein the first thermoplastic layer is extensible and the second thermoplastic layer comprises a reinforcing fabric, wherein said reinforcing fabric renders the second thermoplastic layer requires a greater pressurizing force relative to the first thermoplastic layer for extension.

12. The method of claim 1, wherein the first and second thermoplastic layers each have a thickness between 10 µm and 10 cm.

13. The method of claim 12, wherein the first thermoplastic layer has a thickness of 2.0 mm.

14. The method of claim 12, wherein the second thermoplastic layer has a thickness of 0.2 mm.

15. The method of claim 1, wherein the soft robotic device comprises a plurality of arms.

16. The method of claim 15, wherein the soft robotic device comprises four arms.

* * * * *